(12) United States Patent  
Jung et al.

(10) Patent No.: US 12,383,378 B2  
(45) Date of Patent: Aug. 12, 2025

(54) APPARATUS FOR PROCESSING WIRE PREVENTING Z-AXIS BENDING

(71) Applicant: YOAT CO., LTD., Seoul (KR)

(72) Inventors: Youn Ho Jung, Seoul (KR); Jae Woong Jung, Suwon-si (KR)

(73) Assignee: YOAT CO., LTD., Seoul (KR)

( * ) Notice: Subject to any disclaimer, the term of this patent is extended or adjusted under 35 U.S.C. 154(b) by 307 days.

(21) Appl. No.: 18/028,489

(22) PCT Filed: Dec. 28, 2020

(86) PCT No.: PCT/KR2020/019192  
§ 371 (c)(1),  
(2) Date: Mar. 24, 2023

(87) PCT Pub. No.: WO2022/092442  
PCT Pub. Date: May 5, 2022

(65) Prior Publication Data  
US 2023/0329840 A1     Oct. 19, 2023

(30) Foreign Application Priority Data  
Oct. 28, 2020    (KR) ........................ 10-2020-0141100

(51) Int. Cl.  
    *A61C 7/02*       (2006.01)  
    *A61C 7/14*       (2006.01)  
    *A61C 7/20*       (2006.01)  
    *B21F 1/00*       (2006.01)

(52) U.S. Cl.  
CPC .................................. *A61C 7/026* (2013.01)

(58) Field of Classification Search  
CPC ............... B21F 1/00; B21F 7/00; B21F 23/00  
See application file for complete search history.

(56) References Cited

U.S. PATENT DOCUMENTS

| | | | | |
|---|---|---|---|---|
| 4,989,429 | A * | 2/1991 | Del Fabro | B21D 11/12 72/217 |
| 4,996,866 | A * | 3/1991 | Masera | B21F 1/006 72/216 |
| 5,144,829 | A * | 9/1992 | Fabro | B21D 7/022 72/203 |
| 10,427,208 | B2 | 10/2019 | Perry et al. | |
| 2010/0275668 | A1 * | 11/2010 | Riemeier | B21F 3/00 72/293 |

(Continued)

FOREIGN PATENT DOCUMENTS

| KR | 101629136 B1 | 6/2016 |
|---|---|---|
| KR | 102016243 B1 | 8/2019 |
| KR | 20200074640 A | 6/2020 |

OTHER PUBLICATIONS

The extended European search Report of EP 20 96 0058, Dec. 11, 2024.

(Continued)

*Primary Examiner* — Mohammed S. Alawadi  
(74) *Attorney, Agent, or Firm* — STIP Law Group, LLC (57) ABSTRACT

The present disclosure relates to an apparatus for processing wire which prevents the z-axis bending of the wire, and more particularly, to an apparatus for processing wire which is capable of further maximizing the effect of preventing the z-axis bending of the wire by minimizing wire exposure out of the apparatus.

5 Claims, 8 Drawing Sheets

(56) References Cited

U.S. PATENT DOCUMENTS

2011/0192204 A1* 8/2011 Steinhilber .............. B21D 7/12
 700/165
2016/0114377 A1 4/2016 Riemeier et al.
2017/0312808 A1 11/2017 Suto et al.

OTHER PUBLICATIONS

International search report of PCT/KR2020/019192, Jul. 21, 2021, English translation.

* cited by examiner

APPARATUS FOR PROCESSING WIRE PREVENTING Z-AXIS BENDING

CROSS-REFERENCE TO RELATED APPLICATIONS

This application is the U.S. National Phase under 35 U.S.C. § 371 of International Application No. PCT/KR2020/019192, filed on Dec. 28, 2020, which in turn claims the benefit of Korean Application No. 10-2020-0141100, filed on Oct. 28, 2020, the entire disclosures of which are incorporated by reference into the present application.

TECHNICAL FIELD

The present disclosure relates to an apparatus for processing wire which prevents the z-axis bending of the wire, and more particularly, to an apparatus for processing wire which is capable of further maximizing the effect of preventing the z-axis bending of the wire by minimizing wire exposure out of the apparatus for processing wire.

BACKGROUND ART

Recently, orthodontic treatments have been frequently performed besides medical treatment necessary to improve oral hygiene and maintain healthy teeth. The orthodontic treatment refers to a series of treatments that not only straighten crooked teeth, but also correct various skeletal imbalance that may occur during growth to enable normal functioning. Additionally, as a result of the treatment, healthy oral tissues and more beautiful physiognomies can be expected.

An orthodontic appliance made of orthodontic wire may be mainly used for orthodontic treatment, and the structure and shape of the orthodontic wire may be formed differently according to the tooth structure such as the arrangement and shape of the teeth of the patient subjected to orthodontic treatment.

That is, the orthodontic appliance must be precisely formed in accordance with the oral structure of the patient to be treated, and the forming of the orthodontic wire is often performed manually by an expert.

However, when the orthodontic appliance is manually manufactured by an expert, its quality may vary depending on the technical skills of a worker, so there is a problem in that the quality is not guaranteed and the work efficiency is lowered.

Accordingly, in recent years, in order to solve the increase in cost due to the manual labor for forming the orthodontic appliance, an apparatus for automatically bending and forming a wire used in an orthodontic appliance has been proposed.

In this regard, there is a problem in that bending is not performed as much as desired in a desired direction due to the shape of the twisted wire (in particular, a wire with three strands twisted) in the process of applying the bending to the wire. Particularly, it is a common method to bend a wire with a pin in contact with the wire through the rotation of the pin, and thus, for example, even if you want to bend the wire along the plane formed by the x-axis and y-axis, the wire is also bent in the z-axis due to the characteristics of the twisted shape of the wire. Due to this, there was a problem in that it was not possible to precisely manufacture a work result with desired dimensions.

For this reason, the present applicant has developed an apparatus for processing wire that constrains movement of the wire in the z-axis direction.

FIGS. 1 to 5 are diagrams for illustrating an apparatus for processing wire which was developed by the present applicant. Hereinafter, with reference to FIGS. 1 to 5, the basic concepts and problems of an apparatus for processing wire of the conventional technology (herein, the conventional technology refers to the apparatuses for processing wire which had been developed by the present applicant before an apparatus for processing wire according to the present disclosure) will be explained.

Figure 1:
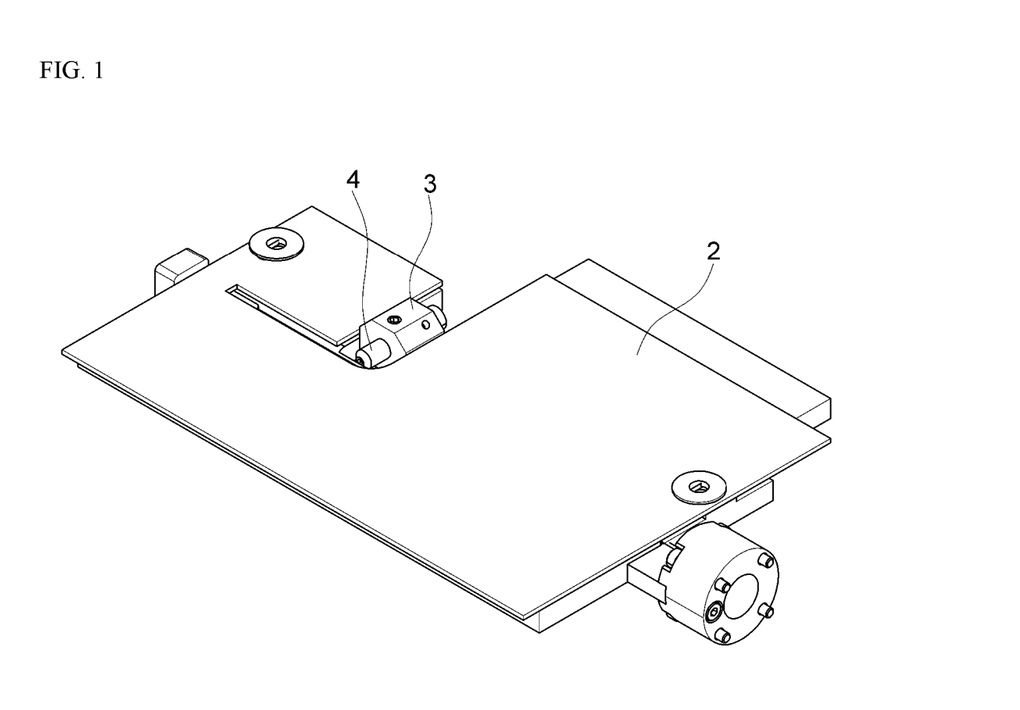
FIGS. 1 to 5 are diagrams for illustrating the conventional apparatus for processing wire which was developed by the present applicant.

First, reference is made to FIG. 1.

The conventional apparatus for processing wire includes a base 1, a glass panel 2 placed above the base 1 and spaced apart from the base 1 a predetermined gap in the z-axis direction, and a wire feeding device located at a point in the vicinity of the base 1. The wire feeding device includes a bracket 3 and a bush 4 coupled to the bracket 3. Although not shown, a device capable of continuously supplying wire may be formed behind the wire feeding device.

Figure 2:
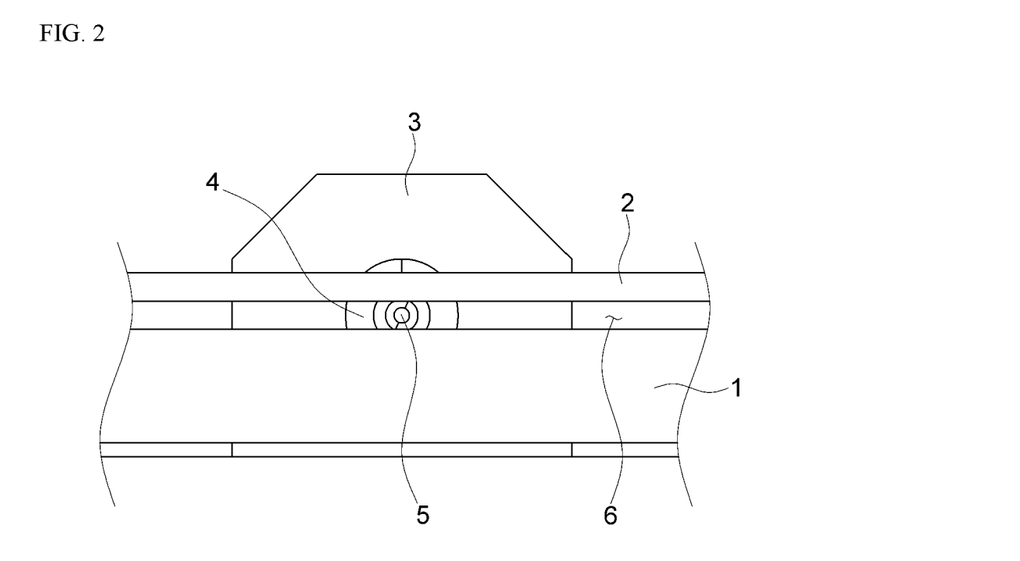
Figure 3:
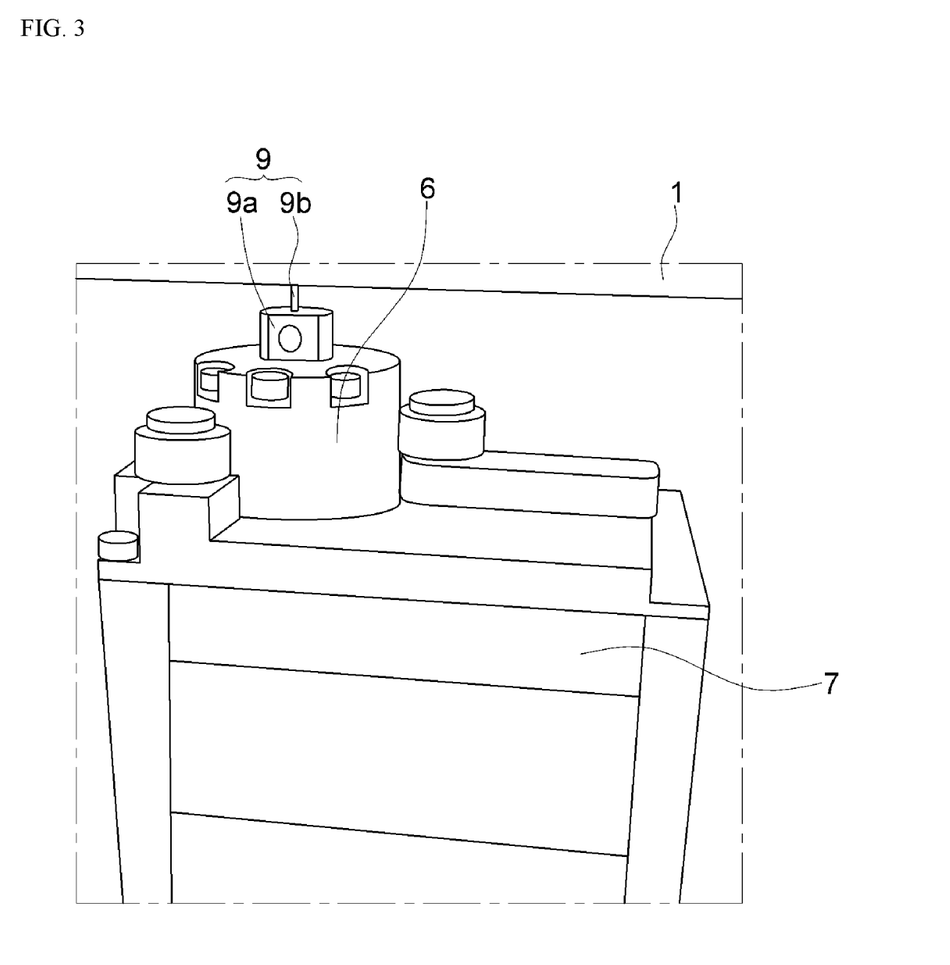

Referring to FIGS. 1 and 2, the wire is fed in the x-axis direction through the discharging hole 5 of the bush 4, and the fed wire is moved through the gap 6 between the base 1 and the glass panel 2. Due to this, when the wire is bent by a bending pin 9 to be described later, the bending is possible only along the plane formed by the x-axis and the y-axis, and bending in the z-axis direction can be restricted.

A rotating body 8 and the bending pin 9 coupled to the rotating body 8 are formed at the lower part of the base 1. The rotating body 8 is powered by a motor 7, and when the rotating body 8 rotates along the plane formed by the x-axis and the y-axis, the bending pin 9 coupled thereto can correspondingly rotate along the plane formed by the x-axis and the y-axis.

The bending pin 9 includes a coupler 9a coupled to the rotating body 8 and a pin 9b coupled to the coupler 9a in the z-axis direction.

Figure 5:
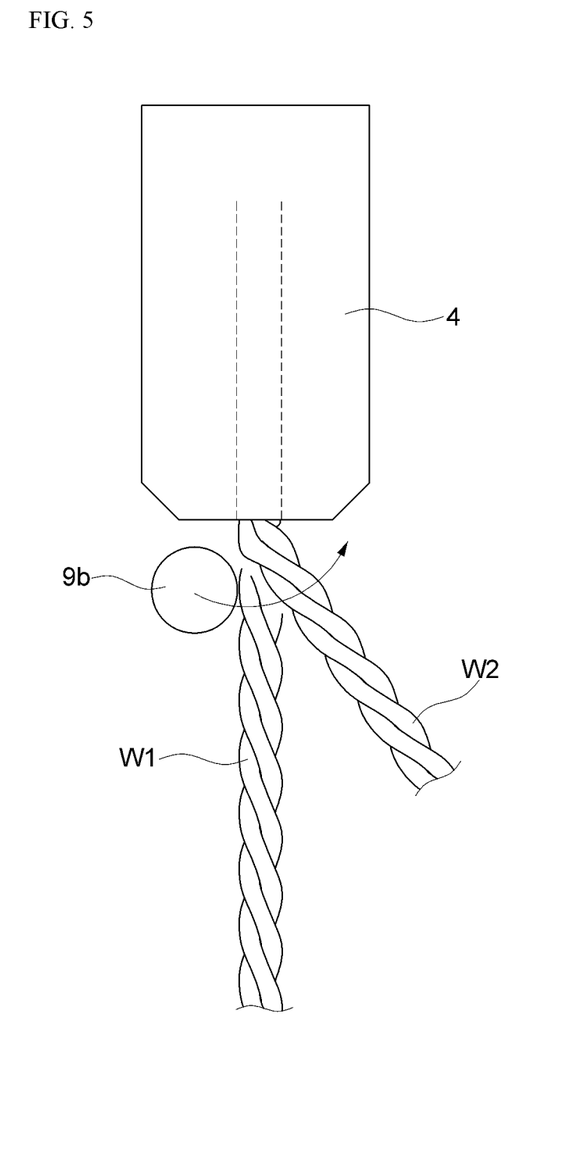

The bending pin 9 may be located in a space formed between the base 1 and the bush 4, in particular, in front of the bush 4 as shown in FIG. 5, and may be moved up and down in the z-axis direction according to control. When the wire before the bending is referred to as 'W1' and the wire after the bending is referred to as 'W2', the wire is fed parallel to the bush in the x-axis direction before the bending, and the pin 9b of the bending pin 9 is brought into contact with the wire and bends the wire into such a form as designated by reference notation 'W2' as the pin 9b of the bending pin 9 rotates along the plane formed by the x-axis and the y-axis. In particular, a bending point (so-called 'pivot point') is formed near the front end of the bush 4.

In this way, the fed wire is moved in the gap 6 between the base 1 and the glass panel 2, and is bent along the plane formed by the x-axis and y-axis in a state where the movement in the z-axis direction is restricted or constrained, so the bending of a wire that is prevented from being bent in the z-axis direction can be applied.

Figure 4:
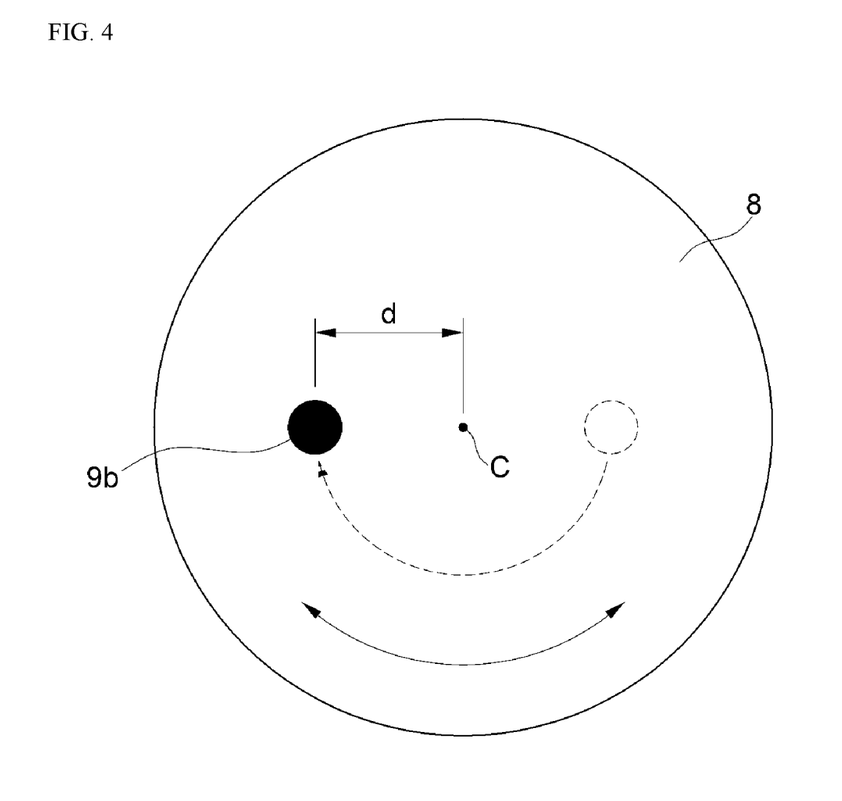

In this regard, referring to FIG. 4, the bending pin 9 or the pin 9b is coupled to the rotating body 8 so as to be located eccentrically (located apart a predetermined distance d from the central axis 'c' of the rotating body 8). Therefore, when the rotating body 8 rotates, the bending pin 9 or the pin 9b rotates in a constant radius without being fixed in a position. Therefore, the operator can determine the rotation direction of the bending pin 9 through control of the rotating body 8, and accordingly, the bending direction of the wire can be determined (herein, the bending direction means the direction related to the determination of whether the wire is bent to the left or right in the process of bending the wire along the plane formed by the x-axis and the y-axis). Therefore, since the bending direction can be appropriately set according to the work environment, work efficiency is increased.

Additionally, although not shown, the bending pin 9 or the rotating body 8 can be moved up and down, and the rotation, upward movement and downward movement of the bending pin 9 can be appropriately controlled according to the type of work to increase work efficiency.

However, the apparatus for processing wire developed by the present applicant had the following drawbacks.

Referring to FIG. 1, there is a space exposed to the outside between the base 1 and the bush 4 due to structural characteristics, and thus in this space, the wire is not constrained in the z-axis direction, which leads to a problematic situation in which a partial bending in the z-axis direction may occur in this space during the working process. Therefore, there is a strong need to further improve the effect of the apparatus for processing wire for preventing the bending of the wire in the z-axis direction by minimizing the exposed space between the base 1 and the bush 4 through which the wire is fed.

SUMMARY OF INVENTION

Technical Problem

The present disclosure relates to an apparatus for processing wire which prevents the z-axis bending of the wire, and more particularly, to an apparatus for processing wire which is capable of further maximizing the effect of preventing the z-axis bending of the wire by minimizing wire exposure out of the apparatus.

Solution to Problem

In order to achieve the objectives of the present disclosure, an apparatus for processing wire preventing z-axis bending according to the present disclosure includes a pair of guide plates spaced apart from each other a predetermined gap in a z-axis direction; a bracket coupled to a point of the pair of guide plates; a bush coupled to the bracket, while passing through the bracket in an x-axis direction from the rear of the bracket; and a pin passing through a point of the bracket in a z-axis direction, wherein when wire is fed from the bush in an x-axis direction, the pin rotates to bend the wire along a plane formed by an x-axis and a y-axis.

Additionally, in the apparatus for processing wire preventing z-axis bending according to the present disclosure, a slit spaced apart leaving a predetermined gap in a z-axis direction is formed in the front of the bracket, and the wire is bent within the slit.

Additionally, in the apparatus for processing wire preventing z-axis bending according to the present disclosure, the wire is bent within the slit and the pair of guide plates.

Additionally, in the apparatus for processing wire preventing z-axis bending according to the present disclosure, the rear of the pair of guide plates is provided with a groove recessed toward the front of the pair of guide plates, and the bracket is in contact with and along the inner surface of the groove.

Additionally, in the apparatus for processing wire preventing z-axis bending according to the present disclosure, the pin is eccentrically located on a rotating body, and is rotated to enable reciprocating motion by the rotating body.

Advantageous Effects

According to the present disclosure, there is an advantage in that it is possible to maximize the effect of the apparatus for processing wire preventing z-axis bending by minimizing the exposure of the wire to the outside of the apparatus by closely contacting the guide plates and the bracket into which the bush is inserted.

BEST MODE

Hereinafter, the detailed description will be made with reference to the drawings of the present disclosure. The embodiments introduced below are provided just as examples in order to sufficiently convey the conceptual idea of the disclosure to those skilled in the art. Therefore, the disclosure is not limited to the embodiments described below, but may be embodied in other forms. Further, the size, thickness or the like of an apparatus may be represented in an exaggerated manner in the drawings for the sake of convenience. The same reference numerals are used throughout the specification to designate the same components.

Advantages and characteristics of the present disclosure, and methods of achieving them will become apparent when the embodiments described below in detail are considered in conjunction with the accompanying drawings. However, the present disclosure is not limited to the embodiments disclosed below, but will be implemented in a variety of different forms, and the present embodiments are only provided so that the description of the present disclosure is complete, and to fully inform those of ordinary skill in the art to which the present disclosure pertains of the scope of the invention, and the disclosure is only defined by the scope of the claims. Like reference numerals refer to like components throughout the specification. The sizes and relative sizes of layers and regions in the drawings may be exaggerated for clarity of explanation.

As used herein, the terms are for the purpose of describing the embodiments, and thus, are not intended to limit the present disclosure. Herein, terms in the singular form also relate to the plural form unless specifically stated otherwise in the context. As used herein, the terms "comprise" and/or "comprising" specify the presence of stated components, steps, operations, and/or elements, but do not preclude the presence or addition of at least one other component, step, operation, and/or element.

Further, in the present disclosure, the x-axis direction and the y-axis direction correspond to the length direction and the width direction, and the z-axis direction refers to a direction perpendicular to the length direction and the width direction. However, the expressions of these directions are for convenience of description, and are not necessarily confined to the use of those terms.

Figure 6:
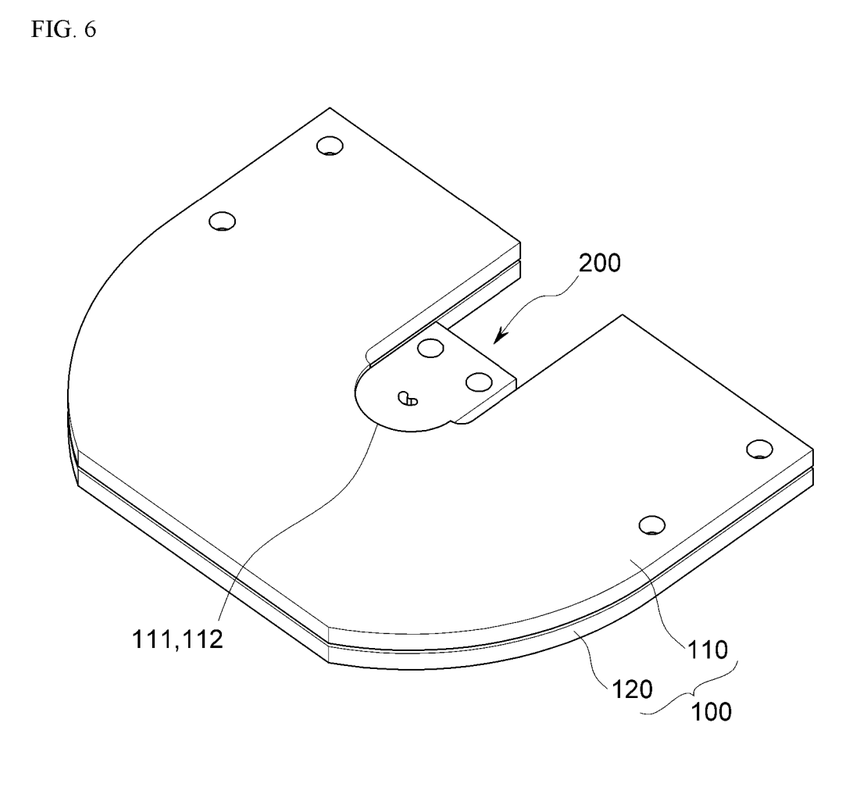
FIG. 6 shows an assembly example of an apparatus for processing wire according to the present disclosure.

FIG. 6 shows an assembly example of an apparatus for processing wire according to the present disclosure.

The apparatus for processing wire according to the present disclosure includes a pair of guide plates 100, a bracket 200, a bush, and a pin 300. In this connection, since the bush described in the conventional technology can be used as it is, reference notation '4' for the conventional bush is utilized.

The pair of guide plates 100 are formed to be spaced apart from each other a predetermined gap in the z-axis direction. Further, the wire is bent between the pair of guide plates 100. Due to this, the wire is constrained with respect to being bent in the z-axis direction, so that it can be bent along the plane formed by the x-axis and the y-axis.

In FIG. 4, in order to distinguish the pair of guide plates 100 from each other, an upper guide plate and a lower guide plate are designated by different reference notations, i.e., 110 and 120, respectively, but they preferably have the same shape.

In addition, couplers (not shown) simultaneously pass through the holes formed in the upper guide plate 110 and the lower guide plate 120 so that the upper guide plate 110 and the lower guide plate 120 can be fixed to each other.

The bracket 200 is preferably coupled to one point of the pair of guide plates 100. More specifically, it is preferable that a pair of grooves 111 and 112 recessed from the rear to the front are formed on the pair of guide plates 100, and the bracket 200 is positioned so as to be in contact with the pair of grooves 111 and 112.

Additionally, in an example, as shown in FIG. 6, the pair of grooves 111 and 112 are preferably rounded, and it is preferable that the front shape of the bracket 200 is also rounded to correspond to the shape of the pair of rounded grooves 111 and 112 (see FIG. 7), so that the bracket can be arranged in such a manner that a space between the pair of grooves 111 and 112 and the bracket 200, through which the wire can be exposed to the outside, can be minimized. With such structure, as will be described in detail later, it is possible to minimize the environment in which the wire is exposed to the outside of the apparatus for processing wire in the process of feeding the wire as in the conventional technology. Due to this, there is an advantage in that the effect of preventing z-axis bending is further increased.

Herein, the reason why the bracket 200 is described as being arranged is because the pair of grooves 111 and 112 and the bracket 200 may be coupled and fixed in position to each other through a coupler (not shown).

Figure 7:
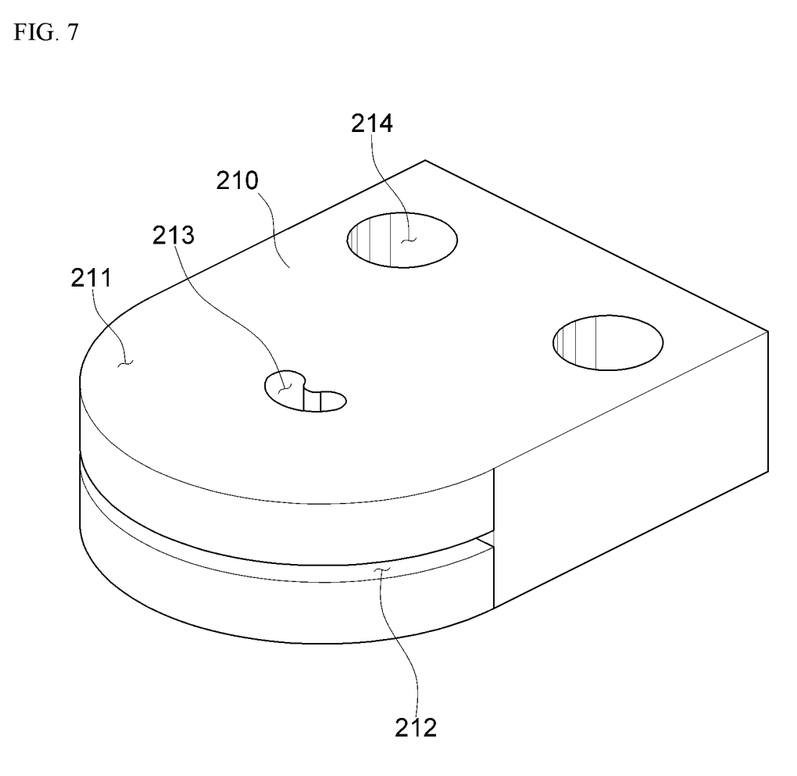
FIG. 7 shows the overall shape of a bracket according to the present disclosure.
Figure 8:
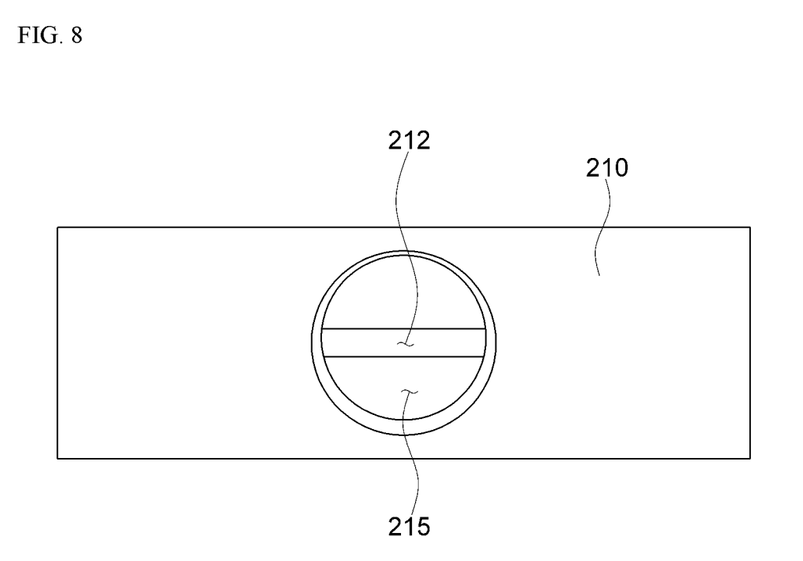
FIG. 8 shows a bracket according to the present disclosure when viewed from the rear.

Now, reference is made to FIGS. 7 and 8. FIG. 7 shows the overall shape of the bracket 200 according to the present disclosure, and FIG. 8 shows the bracket 200 according to the present disclosure when viewed from the rear.

The bracket 200 includes a body 210 having a predetermined thickness in the z-axis direction, a support part 211 for being in contact with the pair of grooves 111 and 112 at the front of the body 210, a slit 212 formed in the support part 211 to be spaced apart leaving a predetermined gap in the z-axis direction, a through hole 213 through which a pin 300 to be described later passes at one point of the body 210 or the support part 211, coupling holes 214 through which couplers (not shown) pass to fix the position, and a bush hole 215 for accommodating the bush 4.

As described above, the support part 211 preferably has a shape complementary to that of the pair of grooves 111 and 112, and may be rounded, for example, as shown in FIG. 7. With such structure, the exposure of the wire can be minimized.

Based on the body 210, the slit 212 forms a space for accommodating the fed wire in the front of the bracket 200, and the bush hole 215 forms a space in the rear of the bracket 200, into which the bush 4 for feeding the wire can be inserted. Therefore, when the bracket 200 is viewed from the rear as shown in FIG. 8, it can be seen that the bush hole 215 and the slit 212 communicate with each other.

Accordingly, the wire fed from the bush 4 inserted into the bush hole 215 is directly introduced into the pair of guide plates 100 through the slit 212. With such structure, the bending is performed by the pin 300 to be described later, and thus, unlike the conventional technology, exposure to the outside of the apparatus can be minimized and bending in the z-axis direction can be prevented, thereby advantageously maximizing the quality of the bent wire.

The pin 300 is preferably formed to extend in the vertical direction, and comes into contact with and bends the wire when being rotated. Additionally, the pin 300 passes through one point of the bracket 200 and, more specifically, through the through hole 213 in the z-axis direction.

The pin 300 is eccentrically coupled to the rotating body as in the conventional technology. Therefore, it is preferable for the pin to form a certain path when rotating according to the rotation of the rotating body. Further, due to the eccentricity, it is possible for the pin to rotate along a circular path. Furthermore, it is possible for the pin to be moved up and down by an elevation member (not shown) through control. A detailed description thereof will be omitted because it would be redundant with the foregoing.

The pin 300 passes through the through hole 213 in the z-axis direction. Here, the meaning of the phrase "pass through" includes not only passing through the entire through hole 213, but also the case where the end of the pin 300 is positioned only up to a point in the through hole 213 in the z-axis direction.

Therefore, when the wire is fed from the bush 4 inserted into the bush hole 215, the wire passes through the through hole 213 in the x-axis direction, and reaches the slit 212. At this time, it is preferable that the wire is fed through the center in the y-axis direction of the through hole 213. Since the pin 300 is eccentrically located on the rotating body, the center of the rotating body can be positioned at the center in the y-axis direction of the through hole 213 so that, when the rotating body rotates, the pin 300 can rotate along a circular path based on the center in the y-axis direction of the through hole 213. A so-called 'left-right reciprocating motion' path can be formed. Therefore, the degree of bending can be accurately calculated around the center of the y-axis direction, so the bending quality of the wire is improved.

Accordingly, the fed wire can be bent to the left or right by the pin 300 rotating within the through hole 213 (here, left or right is based on the plane formed by the x-axis and y-axis). There is an advantage in that bending work efficiency is maximized by enabling bending in two directions instead of bending in one direction. Further, there is an advantage in that exposure of the wire in the z-axis direction can be minimized by forming the formation size of the through hole 213 according to the path along which the pin 300 rotates.

Figure 10:
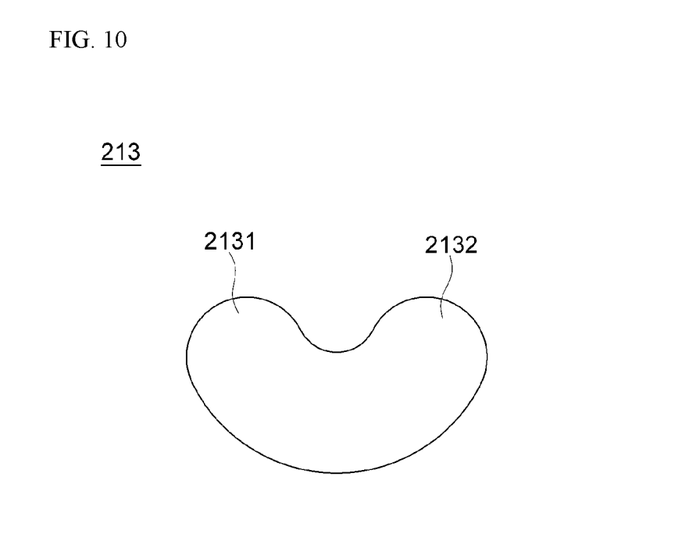
FIG. 10 is an enlarged view of the shape of a through hole according to the present disclosure.

FIG. 10 is an enlarged view of the shape of the through hole 213 according to the present disclosure. The through hole 213 preferably has a shape symmetrical with respect to the center in the y-axis direction, and rounded grooves 2131 and 2132 are preferably formed at respective opposite ends to accommodate the pin 300. With such structure, there is an advantage in that the through hole can serve as a guide slot for guiding the pin 300 in the process of rotating of the pin 300, and at the same time, the rounded shape can minimize the collision impact.

Figure 9:
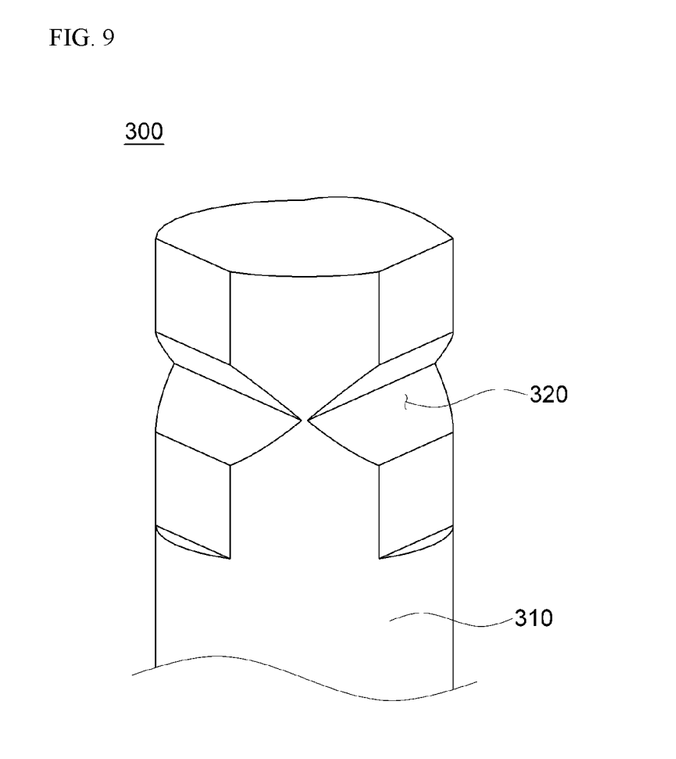
FIG. 9 shows a pin according to another embodiment of the present disclosure.

FIG. 9 shows a pin according to another embodiment of the present disclosure.

The pin 300 according to another embodiment of the present disclosure is provided with a cylindrical pin body 310 and a wire receiving groove 320 formed at an upper end portion of the pin body 310 in the z-axis direction. It is preferable that the wire receiving groove 320 has a shape that is recessed toward the center of the pin body 310. According to an embodiment of the present disclosure, the pin 300 has a cylindrical shape, and when the outer circumferential surface of the pin 300 and the wire came into contact with each other, the wire might slip, so there might be a case where the bending was not performed smoothly. In this regard, according to another embodiment of the present disclosure, since bending is performed with the wire seated in the wire receiving groove 320, there is an advantage in that bending stability is maximized.

Hereinafter, a wire bending process using the apparatus for processing wire according to the present disclosure will be described.

First, the wire is fed from the bush 4 inserted into the bush hole 215. At this time, the wire is introduced between the pair of guide plates 100 through the slit 212. In this regard, the wire passes through the through hole 213 in the process of passing through the slit 212, and the pin 300 rotating along the plane formed by the x-axis and the y-axis within the through hole 213 comes into contact with and bends the wire during its rotation process. At this time, the rotation direction may be changed according to the working environment. Such apparatus for processing wire minimizes external exposure of the wire and prevents bending in the z-axis direction, so there is an advantage in that the bending prevention effect is further maximized than conventional apparatus.

Although the detailed description of the present disclosure described herein has been made with reference to preferred embodiments of the present disclosure, a person skilled in the art or a person having ordinary knowledge in the art will appreciate that various modifications and variations can be made, without departing from the technical scope and idea of the invention as disclosed in the claims to be described later. Therefore, the technical scope of the present disclosure is not limited to the contents described in the detailed description of the specification, but should be defined by the claims.

INDUSTRIAL APPLICABILITY

The present disclosure relates to an apparatus for processing wire which prevents the z-axis bending of the wire, and more particularly, to an apparatus for processing wire which is capable of further maximizing the effect of preventing the z-axis bending of the wire by minimizing wire exposure out of the apparatus for processing wire.

The invention claimed is:

1. An apparatus for processing a wire preventing a z-axis bending, the apparatus comprising:
   a pair of guide plates spaced apart from each other a predetermined gap in a z-axis direction;
   a bracket coupled to a point of the pair of guide plates;
   a bush coupled to the bracket, while passing through the bracket in an x-axis direction from a rear of the bracket; and
   a pin passing through a point of the bracket in the z-axis direction,
   wherein when wire is fed from the bush in the x-axis direction, the pin rotates to bend the wire along a plane formed by an x-axis and a y-axis.

2. The apparatus of claim 1, wherein a slit spaced apart leaving a predetermined gap in the z-axis direction is formed in a front of the bracket, and the wire is bent within the slit.

3. The apparatus of claim 2, wherein the wire is bent within the slit and the pair of guide plates.

4. The apparatus of claim 1, wherein a rear of the pair of guide plates is provided with a groove recessed toward a front of the pair of guide plates, and
   wherein the bracket is in contact with and along an inner surface of the groove.

5. The apparatus of claim 1, wherein the pin is eccentrically located on a rotating body, and the pin is rotated to enable reciprocating motion by the rotating body.

* * * * *